Figure 1:
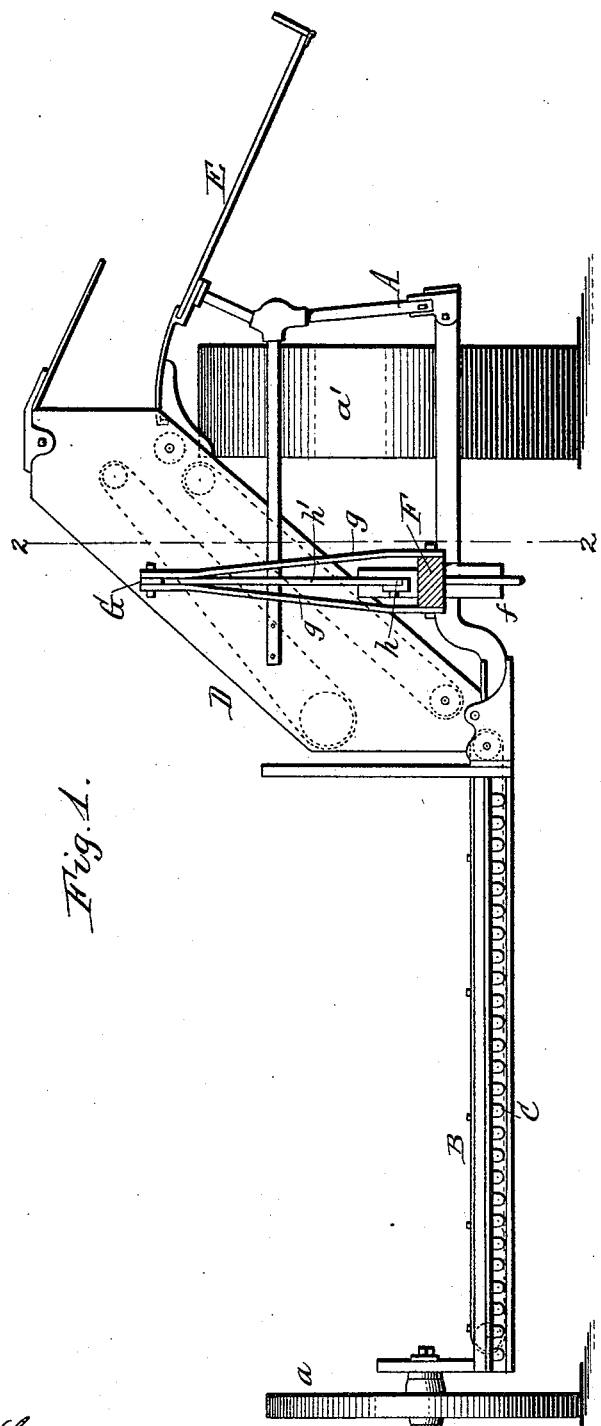

(No Model.) 2 Sheets—Sheet 1.
H. J. CASE.
GRAIN HARVESTER.

No. 579,638. Patented Mar. 30, 1897.

WITNESSES.
Chas. F. Burkhardt
Henry L. Deck

H. J. Case INVENTOR.
By Wilhelm Bonner ATTORNEYS.

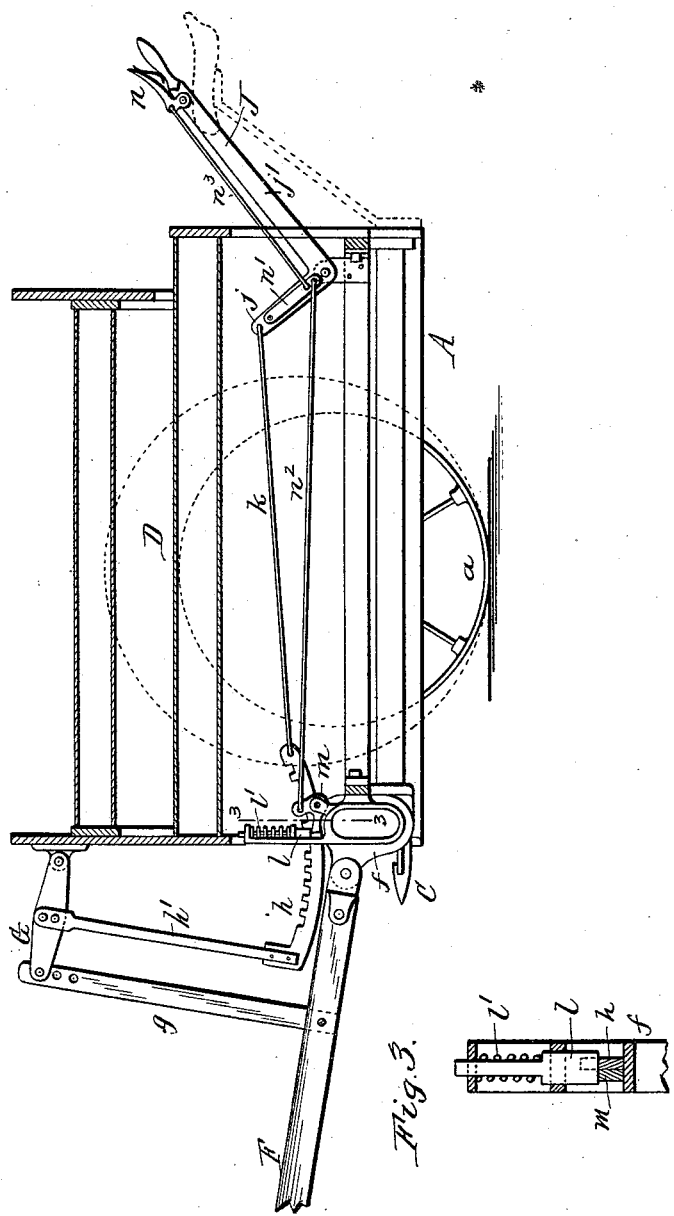

UNITED STATES PATENT OFFICE.

HENRY J. CASE, OF OWASCO, NEW YORK, ASSIGNOR TO THE JOHNSTON HARVESTER COMPANY, OF BATAVIA, NEW YORK.

GRAIN-HARVESTER.

SPECIFICATION forming part of Letters Patent No. 579,638, dated March 30, 1897.

Original application filed March 18, 1895, Serial No. 542,082. Divided and this application filed August 5, 1895. Serial No. 558,247. (No model.)

*To all whom it may concern:*

Be it known that I, HENRY J. CASE, a citizen of the United States, residing at Owasco, in the county of Cayuga and State of New York, have invented new and useful Improvements in Grain-Harvesters, of which the following is a specification.

This invention relates to that class of grain-harvesters in which the main frame and the shaft-pole are adjustably connected, so that the relative position of these parts may be adjusted for raising or lowering the cutter mechanism arranged on the platform for cutting the stubble of the grain different heights.

The object of this invention is to improve the construction of the adjustable connecting mechanism between the main frame and the draft-pole.

This application is a subdivision of an application for Letters Patent for grain-harvesters filed by me March 18, 1895, Serial No. 542,082.

In the accompanying drawings, consisting of two sheets, Figure 1 is a front elevation of a grain-harvester provided with my improvements, the draft-pole being shown in section. Fig. 2 is a vertical longitudinal section in line 2 2 of Fig. 1. Fig. 3 is a vertical transverse section, on an enlarged scale, in line 3 3, Fig. 2.

Like letters of reference refer to like parts in the several figures.

A represents the main frame of the harvester, which is supported at the grainward side by a grain-wheel $a$ and at its stubbleward side by a master or drive wheel $a'$.

B represents the horizontal platform, arranged on the grainward side of the master-wheel, and C the cutter mechanism, arranged along the front end of the platform.

D represents the inclined elevator whereby the grain is carried from the delivery end of the platform to the elevated binder-deck E, upon which the grain is tied into bundles by a tying mechanism of any suitable construction.

F represents the draft-pole, which is pivoted at its rear end to a bracket $f$, secured to the lower front portion of the main frame, and which is practically rigid or firm when the horses are harnessed thereto.

In order to adjust the inclination of the cutter mechanism to different conditions of grain, the main frame of the harvester is tilted on the axles of the grainward and drive wheels by an adjusting mechanism which is constructed as follows:

G represents a forwardly-projecting rock-arm or link, which is arranged above the draft-pole and which is pivoted with its rear end to the front board of the elevator, so as to be capable of swinging vertically with its free front end.

$g$ are standards or links pivoted with their lower ends to the pole in front of the pivot thereof and pivotally connected at their upper ends to the front end of the rock-arm.

$h$ is a segment which is curved concentrically with the pivot of the rock-arm, and which is arranged to slide through an opening formed in the bracket $f$ above the pivot of the draft-pole. The front end of this segment is rigidly connected with the central portion of the rock-arm by a depending bar $h'$. Upon shifting the segment in the bracket forward or backward the rock-arm is turned on its pivot, thereby tilting the main frame of the harvester with reference to the draft-pole and adjusting the inclination of the cutter mechanism with reference to the grain.

J represents a hand-lever whereby the segment is shifted for adjusting the cutter mechanism. This lever is arranged on the rear portion of the machine adjacent to the driver's seat and is pivoted on the adjacent portion of the main frame. The short front arm $j$ of the hand-lever is connected with the rear end of the segment by a rod $k$, whereby the segment can be operated from the rear end of the machine. The segment is locked in position by a vertically-movable catch $l$, which is guided on the upper portion of the bracket $f$ and held in engagement with one of a row of notches in the upper side of the segment by a spring $l'$.

$m$ is a releasing elbow-lever whereby the spring-catch is raised out of the notch of the segment. This lever is pivoted on the bracket $f$ on one side of the segment and engages with one of its arms against the under side of the spring-catch.

$n$ is a releasing-handle pivoted on the rear arm $j'$ of the hand-lever J, and $n'$ is an intermediate rock-arm whereby the movement of the handle $n$ is transmitted to the releasing-lever. This rock-arm is pivoted to one end of the front arm $j$ of the hand-lever and is arranged with its free end close to the pivot of the hand-lever.

$n^2$ $n^3$ represent rods which connect the intermediate rock-arm $n'$ with the upper arm of the releasing elbow-lever and the releasing-handle, respectively. When it is desired to adjust the inclination of the cutter mechanism, the spring-catch is released by the releasing-handle, and the segment is then shifted by the hand-lever to secure the proper inclination of the cutter mechanism, after which the spring-catch is again permitted to engage with the segment to hold the parts in the adjusted position. By interposing the rock-arm $n'$ between the rods $n^2$ $n^3$ the line of draft of the releasing-lever is carried near the pivot of the hand-lever J, thereby avoiding cramping of any of the parts and permitting the spring-catch to be operated in any position of the hand-lever. By arranging the segment and the spring-catch adjacent to the pivotal connection between the main frame and the draft-pole these parts are firmly held in their adjusted position and the cutter mechanism is caused to cut the stubble of a uniform length.

In my improved adjusting mechanism the parts whereby the pole is adjustably connected with the frame are arranged in the lower portion of the main frame, and the limited space which is available in the lower portion of the machine is thereby utilized. The lower portion of the frame is the strongest and most rigid part of the frame and best able to resist the strains, jars, and vibrations resulting from this connection, while the upper portion of the main frame is correspondingly relieved. This does away with all tendency of the upper portion of the machine to dip or droop or assume a permanent set, whereby the working of the various mechanisms mounted in the main frame would be impaired.

I claim as my invention—

1. In a grain-harvester, the combination with the main frame, the cutter mechanism, and the draft-pole pivoted to the lower front portion of the main frame, of an upright link pivoted to the draft-pole in front of its pivot, a rock-arm pivotally connected with the upper portion of said link and with the main frame, a segment connected rigidly with said rock-arm and arranged below the same near the pivot of the draft-pole, and a catch mounted on the lower front portion of the main frame and adapted to hold the movable segment in its adjusted position, substantially as set forth.

2. In a grain-elevator, the combination with the main frame, the cutter mechanism, the elevating mechanism, and the draft-pole pivoted to the lower front portion of the main frame, of an upright link pivoted to the draft-pole in front of its pivot, a rock-arm pivotally connected with the upper portion of said link and with the main frame, a segment rigidly connected with said rock-arm and arranged below the same and below the elevating mechanism, a catch mounted on the lower front portion of the main frame and adapted to hold the movable segment in its adjusted position, an adjusting-lever arranged on the lower rear portion of the draft-frame, and a connection extending from said lever underneath the elevating mechanism to the movable segment, substantially as set forth.

3. In a grain-harvester, the combination with the main frame, the cutter mechanism, and the draft-pole pivoted to the front portion of the main frame, of an upright link pivoted to the pole in front of its pivot, a rock-arm pivotally connecting the upper end of said link with the front portion of the main frame, a segment arranged below said rock-arm and connected therewith, a hand-lever arranged on the rear portion of the main frame and provided with a front and rear arm, a rod connecting the front arm of said lever with said segment, a catch adapted to engage with the segment, a releasing-lever having one of its arms engaging with said catch, an intermediate lever pivoted to the front arm of the hand-lever, a rod connecting the intermediate lever with the releasing-lever, a releasing-handle pivoted on the rear arm of the hand-lever, and a rod connecting the intermediate lever with said releasing-handle, substantially as set forth.

Witness my hand this 31st day of July, 1895.

HENRY J. CASE.

Witnesses:
EDWARD WILHELM,
GEO. A. FARRALL.